(12) United States Patent
Post (10) Patent No.: US 9,345,370 B2
(45) Date of Patent: May 24, 2016

(54) CLEANING APPARATUS (71) Applicant: Kenneth Post, Lincoln Park, MI (US)

(72) Inventor: Kenneth Post, Lincoln Park, MI (US)

(*) Notice: Subject to any disclaimer, the term of this patent is extended or adjusted under 35 U.S.C. 154(b) by 205 days.

(21) Appl. No.: 14/216,262

(22) Filed: Mar. 17, 2014

(65) Prior Publication Data

US 2014/0259499 A1   Sep. 18, 2014

Related U.S. Application Data

(60) Provisional application No. 61/879,819, filed on Sep. 19, 2013, provisional application No. 61/896,734, filed on Oct. 29, 2013, provisional application No. 61/792,262, filed on Mar. 15, 2013.

(51) Int. Cl.
| | |
|---|---|
| *A47L 1/15* | (2006.01) |
| *A47L 1/06* | (2006.01) |
| *A47L 13/16* | (2006.01) |
| *A47L 13/256* | (2006.01) |
| *A47L 13/20* | (2006.01) |
| *A47L 13/254* | (2006.01) |
| *B60S 3/04* | (2006.01) |

(52) U.S. Cl.
CPC .... *A47L 1/15* (2013.01); *A47L 1/06* (2013.01); *A47L 13/16* (2013.01); *A47L 13/20* (2013.01); *A47L 13/254* (2013.01); *A47L 13/256* (2013.01); *B60S 3/045* (2013.01)

(58) Field of Classification Search
CPC ............ A47L 1/06; A47L 1/15; A47L 13/10; A47L 13/16; A47L 13/20; A47L 13/24; A47L 13/254; A47L 13/256; A47L 13/257; A47L 13/44; A47L 13/46; B60S 3/045
USPC ............... 15/220.1, 228, 231, 232, 244.3
See application file for complete search history.

(56) References Cited

U.S. PATENT DOCUMENTS

| | | | |
|---|---|---|---|
| 296,235 A | 4/1884 | Sill | |
| 672,584 A | 1/1901 | Anderson | |
| 825,400 A | 7/1906 | Lightbrown | |
| 1,084,184 A | 1/1914 | Wenieke | |
| 1,158,846 A | 11/1915 | Punch | |
| 1,162,784 A * | 12/1915 | Kajerdt | A47L 1/09 15/220.1 |
| 1,378,243 A | 5/1921 | Kracke | |
| 1,675,736 A | 7/1926 | Sturgis | |
| 1,708,052 A | 4/1929 | Channell | |
| 1,993,571 A | 10/1934 | Soderberg | |
| 1,989,921 A | 2/1935 | Goddard | |
| 2,192,910 A | 4/1937 | Hollenbeck | |

(Continued)

FOREIGN PATENT DOCUMENTS

| | | |
|---|---|---|
| EP | 950369 | * 10/1999 |
| FR | 1056318 | 10/1953 |
| GB | 406211 | 2/1934 |

OTHER PUBLICATIONS

International Search Report for PCT/US14/30724 dated Aug. 18, 2014.

*Primary Examiner* — Mark Spisich (74) *Attorney, Agent, or Firm* — Young Basile Hanlon & MacFarlane P.C.

(57) ABSTRACT

A cleaning head includes tip and corner ends configured for providing enlarged areas at the tip and corner ends of the cleaning head to enable the cleaning element to form a sharp 90° corner when wrapped around the tip and corners of the cleaning head.

11 Claims, 5 Drawing Sheets

(56) References Cited

U.S. PATENT DOCUMENTS

| | | |
|---|---|---|
| 2,127,886 A | 7/1937 | Plon |
| 2,291,435 A | 7/1942 | Anderson et al. |
| 2,315,325 A | 3/1943 | Gavurin |
| 2,301,586 A | 11/1943 | Rubin |
| 2,304,127 A | 12/1943 | Stetson |
| 2,500,841 A * | 3/1950 | Fellman .................. A47L 13/29 15/228 |
| 2,560,008 A | 7/1951 | Steward |
| 2,694,212 A | 11/1954 | McGraw |
| 2,722,704 A | 11/1955 | Warden |
| 2,764,774 A | 10/1956 | Belsky et al. |
| 3,362,037 A | 1/1968 | Griffin |
| 3,704,479 A | 12/1972 | Whitaker |
| 3,761,991 A | 10/1973 | Moss |
| 4,503,579 A | 3/1985 | Nicely |
| 4,822,194 A | 4/1989 | Simonette |
| 4,852,210 A * | 8/1989 | Krajicek .................. A47L 13/20 15/144.2 |
| 4,926,522 A | 5/1990 | Wang |
| 5,003,659 A | 4/1991 | Paepke |
| 5,012,544 A | 5/1991 | Verry |
| 5,095,574 A | 3/1992 | Khanzadian |
| 5,333,347 A | 8/1994 | Stranders |
| 5,556,470 A | 9/1996 | Gruber |
| 5,596,787 A | 1/1997 | Stevens et al. |
| 5,603,138 A | 2/1997 | Bonis |
| 5,657,507 A | 8/1997 | Wasak |
| 5,876,141 A | 3/1999 | Hsu |
| 5,918,342 A | 7/1999 | Smith et al. |
| 6,178,584 B1 | 1/2001 | Post et al. |
| 6,523,213 B1 | 2/2003 | Post et al. |
| 6,543,951 B1 | 4/2003 | Bauman |
| 6,769,153 B1 | 8/2004 | Post et al. |
| 6,795,999 B1 | 9/2004 | Post et al. |
| 6,928,687 B2 | 8/2005 | Post et al. |
| 6,973,695 B1 | 12/2005 | Nesler |
| 7,231,684 B2 | 6/2007 | Post |
| 7,343,638 B2 | 3/2008 | Mitchell et al. |
| 7,401,376 B2 | 7/2008 | Benjamin et al. |
| 7,555,814 B2 | 7/2009 | Lee et al. |
| 7,581,273 B2 | 9/2009 | Dobrin et al. |
| 7,904,987 B2 | 3/2011 | Bayou et al. |
| 8,250,700 B2 | 8/2012 | Pung et al. |
| 8,407,848 B2 | 4/2013 | Pung et al. |
| 2004/0237240 A1 | 12/2004 | Post et al. |
| 2005/0034260 A1 | 2/2005 | Post |
| 2005/0138742 A1 | 6/2005 | Jaszenovics et al. |
| 2007/0245509 A1 | 10/2007 | Nesler |
| 2008/0022473 A1 | 1/2008 | Risch et al. |
| 2008/0034521 A1 | 2/2008 | Pobasco |
| 2008/0172817 A1 | 7/2008 | Riddell |
| 2009/0025168 A1 | 1/2009 | DeRoma |

* cited by examiner

CLEANING APPARATUS

CROSS REFERENCE TO CO-PENDING APPLICATION

Applicant claims priority benefit to the filing dates of U.S. Provisional Patent Application Ser. No. 61/792,262, filed Mar. 15, 2013, U.S. Provisional Patent Application Ser. No. 61/879,819, filed Sep. 19, 2013 and U.S. Provisional Patent Application Ser. No. 61/896,734, filed Oct. 29, 2013, the contents of each of which are incorporated herein in its entirety.

BACKGROUND

The present disclosure relates, in general, to cleaning apparatus and, more specifically, to apparatus for cleaning glass.

Various tools are available to clean glass, such as the exterior surface of vehicle windows. Such tools typically include a handle and a perpendicularly oriented cleaning element, such as a wiper blade, sponge rubber pad, and combinations thereof. Water or ammonia based cleaning fluid is applied to the exterior surface of the vehicle window and scraped off by the tools to remove debris. Such tools are easy to use on the exterior surface of vehicle windows since the exterior surface of the vehicle windows is easily accessible both to apply cleaning fluid to the windows and to remove the fluid and debris from the windows.

However, such tools are ineffective in cleaning the inner surface of vehicle windows. The extreme angles of the vehicle windshield and backlight with respect to the dashboard and rear seat shelf in conjunction with adjacent vehicle components, such as the rear view mirror, steering wheel and rear, center brake light housing make it difficult to get the edges of a cleaning tool close to the extreme lower edges of the windshield and backlight. In addition, applying fluid, which is typically in the form of a spray, to the inner surfaces of the windshield and backlight results in a significant amount of the spray being deposited on the underlying horizontal surfaces adjacent to the windows, such as the vehicle dashboard and the rear shelf?

Thus, the most common implements used to clean the inner surfaces of vehicle windows are sponges, rags, and paper towels. Manual force is exerted through the user's hands to manually apply cleaning fluid and/or spray to the inner surface of the windows and then to manipulate the cleaning element in a back and forth or circular motion across the surface of the windows. While a user may be able with a considerable amount of effort to clean most of the inner surface of the vehicle window, it is still difficult to completely clean the edges of the window and, more importantly, the lower edges of a vehicle windshield and backlight.

A variety of tools has been devised specifically to clean the inner surfaces of vehicle windows. Such tools are typically formed of a pad which is connected to an elongated handle. A cleaning element is attached to one side of the pad by various means including clips, straps, or hooks and pile fasteners. However, each of these tools is specifically devised for a single type of cleaning operation, such as scrubbing or drying, but not both.

An improved and more effective cleaning apparatus is disclosed in U.S. Pat. Nos. 7,231,684 and 6,795,999. In this cleaning apparatus, the inner absorbent layer between the bottom surface of the paddle and the encompassing cleaning element or bonnet is formed of an easily compressible foam material. Besides being absorbent, the foam layer provides a high friction-gripping surface for the cleaning element or bonnet to retain the cleaning element or bonnet in its formed shape and in continuous contact with the underlying surface being cleaned.

However, the substrate foam layer is severely affected by the cleaning head design, which results in a non-existent cleaning outcome in several critical areas of the cleaning apparatus, typically at the tip and corner edges of the paddle and along the side edges between the tip and the corner edges of the paddle.

Figure 9:
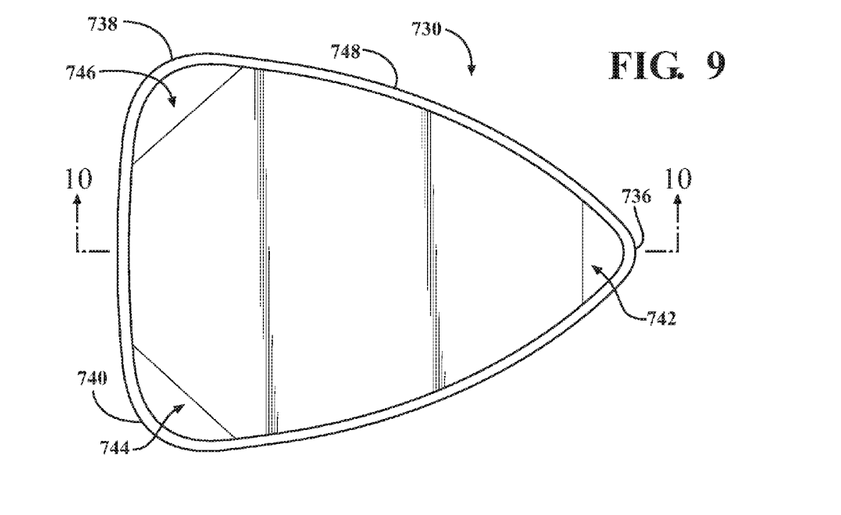
FIG. 9 is a bottom elevational view of another aspect of a cleaning head.

The combination of the height of the foam layer which has a $3/16^{th}$ inch thickness and projects outward from the $1/16^{th}$ length peripheral of the paddle by another $1/8^{th}$ inch, along with the acting force of the elastic cleaning element cover attached over the paddle results in the foam layer being compressed at the tip and corner edges and/or the side edges of the paddle to the point that the foam is unable to retain its full thickness at each of the critical tip and corner edges and/or along the side edges. This results in separation of the cleaning element below this portion of the foam layer from contact with the surface being cleaned, as shown in FIG. 9, resulting in incomplete cleaning of the entire surface The existing cleaning apparatus has a $1/16^{th}$ inch peripheral lip or ridge added to a uniformly thick $1/16^{th}$ inch cleaning head or paddle to aid in increasing the structural integrity of the thin $1/16^{th}$ inch cleaning head. This creates a paddle with a $1/8^{th}$ inch total height for peripheral edge wall. A one-inch wide cutout of the $1/16^{th}$ inch perimeter wall height at the center side areas of the cleaning head adjacent to the handle receivers was added to aid in cleaning head flexibility.

SUMMARY

A cleaning apparatus with a cleaning head having a top surface, a bottom surface and a peripheral edge, a handle pivotally coupled to the cleaning head, and a cleaning element removably affixed to the cleaning head. The cleaning element includes a body and elastic for removably securing the body over the bottom surface and the peripheral edge of the cleaning head, a peripheral lip depending from the peripheral edge of the cleaning head a surrounding the bottom surface of the cleaning head. The cleaning head has a triangular shape with a tip end and two opposed ends. An enlarged area is disposed at the tip end and at each of the two opposed ends of the cleaning head extending over a bottom surface of the cleaning head to an outer most edge of the peripheral lip, the compressive foam layer carried on the bottom surface of the cleaning head in between the peripheral lip and each of the enlarged area.

The cleaning apparatus includes pads having a length from an adjacent one of the tip end and the opposed ends of between 0.5 and 1.0 inches.

The cleaning apparatus can have the enlarged areas defining pads having flat surfaces.

The cleaning apparatus can have the enlarged area formed as pads defining a hard surface.

The cleaning apparatus can have the enlarged area formed as pads integrally molded with the cleaning head.

The cleaning apparatus can have the enlarged area as pads defining a separate element fixedly mounted adjacent the tip end and two opposed ends on the bottom surface of a cleaning head.

The cleaning apparatus the enlarged areas where the portions of the peripheral lip adjacent to the tip end and each of the opposed ends of the cleaning head having an increased thickness relative to the remainder of the peripheral lip, and a compressive material layer carried on the bottom surface of the cleaning head and disposed between the peripheral lip of the cleaning head, the compressive material layer having a thickness at least the same as the thickness of the increased thickness portions peripheral lip portions at the tip end and the opposed ends of the cleaning head.

In one aspect, the tip end and the opposed ends of the cleaning head are disposed at a depending angle relative to the bottom surface of the cleaning head to generate downward force on the tip end and the opposed ends of the cleaning head when the cleaning head is engaged with a surface to be cleaned.

The tip end and the opposed ends of the cleaning head can be disposed at a linear obtuse angle relative to the bottom surface of the cleaning head.

The depending portions of the cleaning head at the tip end and the opposed ends can be disposed at an arcuate bend relative to the bottom surface of the cleaning head.

The cleaning apparatus can have the plurality of side edges of the cleaning head disposed at a downward depending angle relative to the bottom surface of the cleaning head.

BRIEF DESCRIPTION OF THE DRAWING

The various features, advantages and other uses of the present cleaning apparatus will become more apparent by referring to the following detailed description and drawing in which.

DETAILED DESCRIPTION

Figure 1:
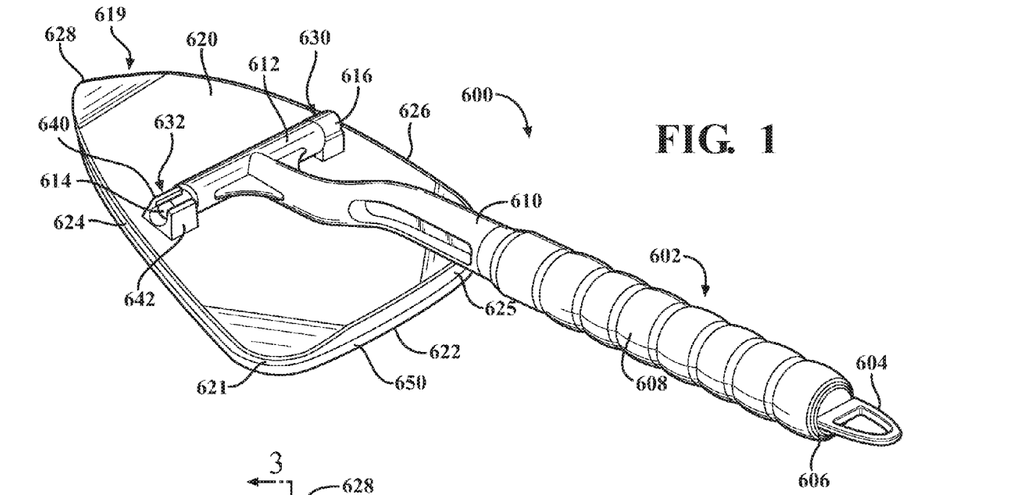
FIG. 1 is one aspect of a cleaning apparatus.
Figure 2:
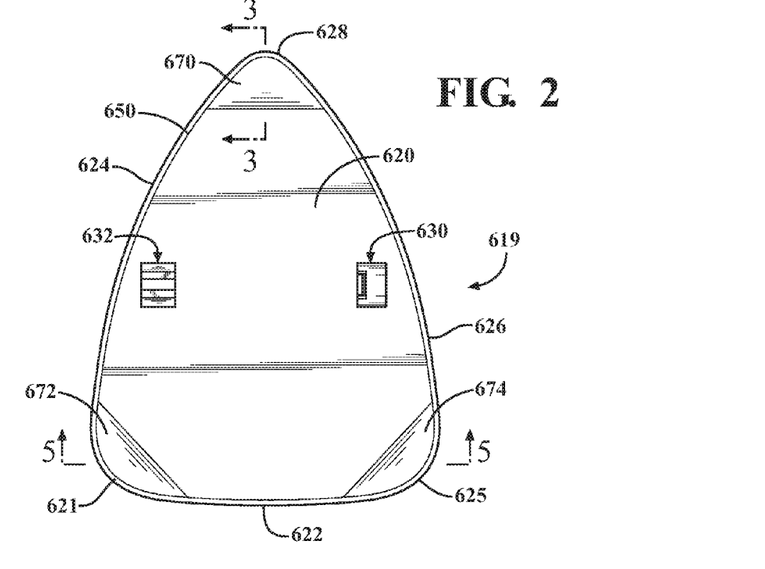
FIG. 2 is a plan view of the cleaning head of the cleaning apparatus shown in FIG. 1.
Figure 3:
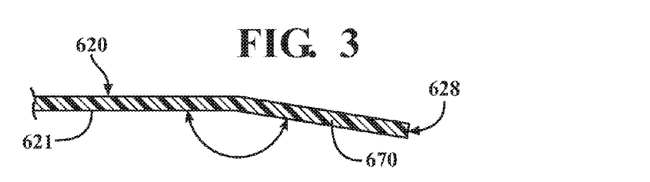
FIG. 3 is a cross-sectional view generally taken along line 3-3 in FIG. 1.

Referring now to the drawing, and to FIGS. 1-3 in particular, there is depicted a cleaning apparatus 600.

The cleaning apparatus 600 includes a handle 602 having a mounting hangar 604 at a first end 606. A handgrip portion 608 extends from the first end 606 and is formed or covered with a high friction, easily grippable material.

The handle 602 continues from the handgrip portion 608 through a solid portion 610 to a T-shaped second end 612. Mounting pins 614 and 616, which may be integrally molded as part of the end 612 or fixedly mounted in the end 612, project oppositely from the end 612.

A cleaning head 619 includes a paddle 620 has a generally triangular shape formed of an end 622, opposed angled or gently curved side edges 624 and 626, an apex or tip 628 opposite the end 622, and corners or corner edges 621 and 625 formed between the end 622 and the side edges 624 and 626. The center portion of the side edges 624 and 626 may be raised slightly from a plane extending between the ends 622 and 628 along a longitudinal axis of the paddle 620 to form at least the bottom surface of the paddle 620 in a concave shape. The entire paddle 620 may have the same concave shape. Alternately, the central portion of the paddle 620 may have a reduced thickness than the end 622 and tip 628.

Receivers 630 and 632 are integrally or separately fixed to one surface of the paddle 620. The receiver 630 is in the form of a body having an arcuate outer shape, for example. A bore extends through at least one side of the receiver 630 and opens toward the opposite receiver 632.

In this aspect, the receiver 632 forms a snap connection with the pin 614 on the handle 602. The receiver 632 is formed of first and second resiliently movable, spring legs 640 and 642. The legs 640 and 642 project from the top surface of the paddle 620 to outer ends. The inner surfaces of the legs 640 and 642 have a generally arcuate shape, sized to pivotally receive and capture the pin 614 on the handle 602. The inner space or distance between the ends of the legs 640 and 642 is less than the outer diameter of the pin 614.

In use, the pin 614 is forced through the opening between the ends of the legs 640 and 642 bending the legs 640 and 642 outward until the entire pin 614 passes through the ends. At this time, the legs 640 and 642 snap back to a normal position rotatably capturing the pin 614 therein.

It will be understood that the snap-connection provided by the receiver 632 can also be repeated for the receiver 630 by forming the receiver 630 in the same manner as the receiver 632.

For enhanced rigidity of the paddle 620, while still retaining the flexibility of the paddle 620 to adapt the concave shape of the bottom surface of the paddle 620 to a window or glass surface, a peripheral ridge or lip 650 is integrally formed on the paddle 620 along the side edges 624 and 626 and the end 622 to substantially completely encompass the entire periphery of the bottom surface of the paddle 620. The lip 650 surrounds an inner disposed absorbent layer, described hereafter. A notch or cutout can be formed along each side edge of the lip underlying the side edges 624 and 626 of the paddle 620 and generally centered along the lateral axis of the receivers 630 and 632. The notch enhances the flexibility of the paddle 620 when a downward force is exerted on the paddle 620 through the handle 602.

Figure 4:
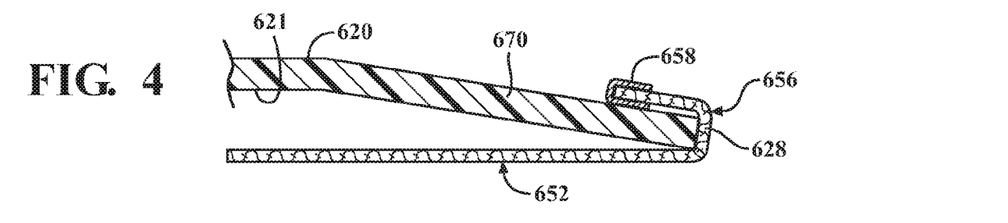
FIG. 4 is an enlarged, partial, cross-sectional view similar to FIG. 3, and showing the attachment of the cleaning element around the tip of the cleaning head.

The cleaning apparatus including a cleaning element formed of a drying element 652 mountable on the paddle 620 is shown in FIG. 4. The drying element 652 is in the form of a pliable body (also 652) sized to releasably mount about the paddle 620. The body 652 has a first major surface which is disposable under the bottom surface 621 of the paddle 620 and a peripheral edge 656 surrounding an open end. The peripheral edge 656 may be stitched to prevent unraveling or separation of the fibers forming in the body 652. The body 652 can be formed of an absorbent material, such as cotton, etc.

Elastic means 658 in the form of an elastic band is stitched or otherwise attached to the peripheral edge 656 of the body 652 to provide an elastic force for closing the peripheral edge 656 to a small open diameter to thereby securely, yet releasably mount the body 652 about the paddle 620. At the same time, the elastic means 658 allows the body 652 to be easily removed from the paddle 620 and replaced with a clean, dry body 652 when necessary.

As shown in FIGS. 1-5, the cleaning head 619 has downward formed tip 670 and corner ends 672, 674 and alternately side edges 624, 626 and 622 extending from the more planar central portion of the cleaning head 619.

Figure 5:
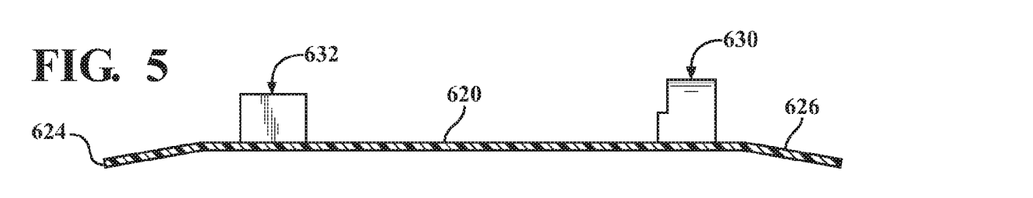
FIG. 5 is a lateral cross-sectional view through the receivers shown in FIG. 2.

The downward bent or formed tip 670 and corner ends 672, 674 shown in FIGS. 2, 3, and 4 or the side edges 622, 624, 626 shown in FIG. 5, can be pre-formed to the desired downward angle during the molding of the cleaning head 619 or bent after the head 619 has been formed.

For example, the tip 670 and opposed ends 672, 674 of the cleaning head 619 can be bent to a linear, obtuse angle from the bottom surface 621 of the central portion of the cleaning head 619 as shown in FIG. 3. Alternately, the tip 670 and opposed corner ends 672, 674 may be bent in a downward direction away from the central portion of the cleaning head 619 in a gradual radius or curve.

The length of the bent area of the tip 670 and the opposed ends 672, 674, or the side edges 622, 624, and 626, may vary from ½ to 1 inch or in length from the outer edge of the cleaning head 619.

As shown in a preliminary use position in FIG. 4, prior to force being exerted through the handle 602 to the cleaning head 619, the tip 670 and corner ends 672, 674 initially engage the surface to be cleaned. When downward force is exerted on the cleaning head 619 through the handle 602, the cleaning head 619 flattens in a normal manner thereby bringing the entire bottom surface 621 of the cleaning head 619 and the attached cleaning element 652 into contact with the surface to be cleaned. However, the downward bent tip 670, corner ends 672, 674, or side edges 622, 624, 626 exert an additional downward force on the peripheral edges of the cleaning element 652 thereby maintaining the peripheral edges of the cleaning element 652 in contact with the surface to be cleaned despite any angular positioning of the cleaning head 619 over the surface to be cleaned.

Figure 6:
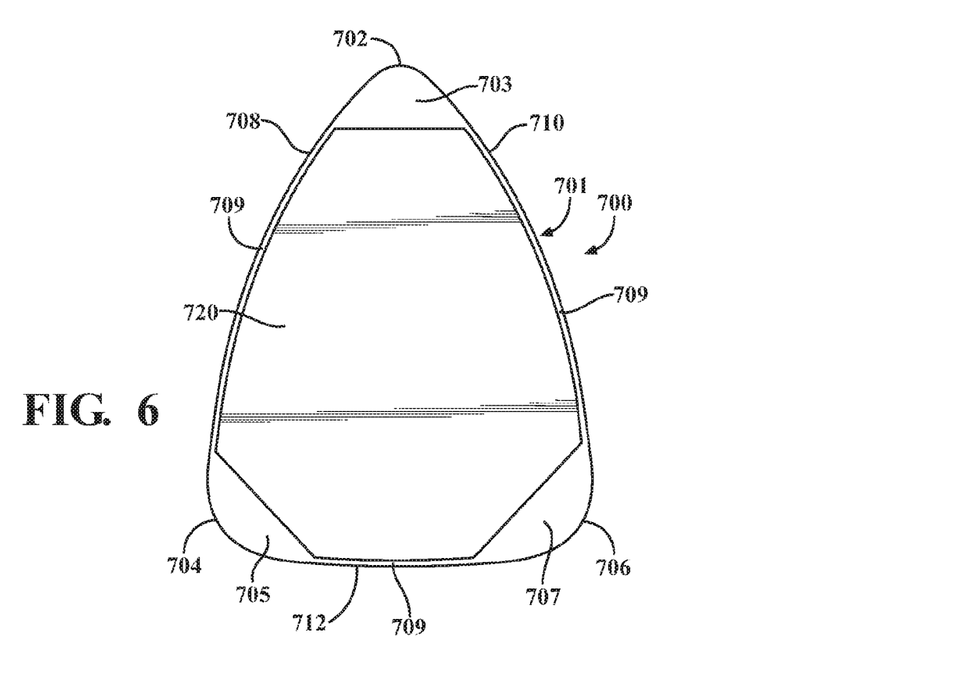
FIG. 6 is a bottom view of another aspect of a cleaning head.
Figure 7:
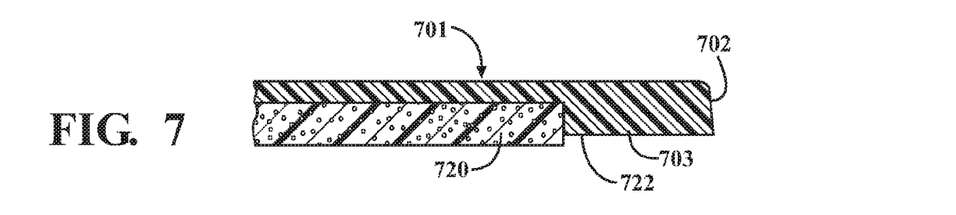
FIGS. 7 and 8 are cross-sectional views showing the arrangement of the compressive foam layer and the cleaning element around the tip and corner ends of the cleaning head shown in FIG. 6.
Figure 8:
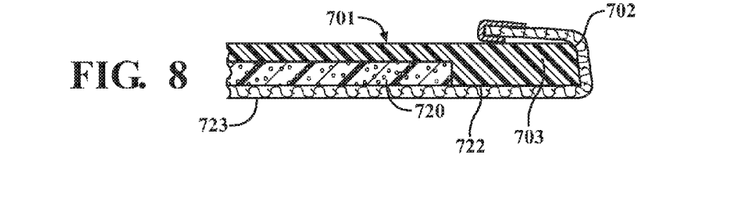

Another aspect of a cleaning apparatus 700 is shown in FIGS. 6-8. In this aspect, a cleaning head 701 has the same general shape and peripheral lip construction as that shown in FIGS. 1-5. However, compared to the prior $\frac{1}{16}^{th}$ thick peripheral lip or sidewall of the cleaning head in FIGS. 1-5, the tip 702 and the opposed corner ends 704,706 of the cleaning head 701 are enlarged lengthwise on the bottom surface from slightly greater than $\frac{1}{16}^{th}$ inch up to approximately 1.0 inch, plus or minus 0.25 inches to form enlarged pads 703, 705 and 707. This feature enlarges the surface area of the tip 702 and the corner ends 704, 706 of the cleaning head 701 so as to provide the tip 702 and corner ends 704, 706 with an enlarged downward facing surface onto the underlying cleaning element to insure that all portions of the cleaning element as the cleaning element wraps around the edge of the tip 702 and the corner ends 704, 706 of the cleaning head 700 remain in contact with the underlying surface to be cleaned.

Additional downward force can be provided for the side edges 708, 710, 712 by increasing the thickness of the lip 709 alongside the side edges 708, 710, 712 from the typical $\frac{1}{16}^{th}$ inch to a range of between 0.065 to 0.125 inches.

It should be noted that the foam substrate 720, in this cleaning apparatus 700, extends behind and below the enlarged surface area pads 703, 705 and 707 of the tip and the peripheral side edges 708, 710, 712 as shown in FIG. 7. The reduced thickness of the foam substrate 720, of the exposure range described above of between 0.001 to 0.0925 inches beyond the lower most edge 722 of the peripheral lip 709 insures that the cleaning element 723 remains in a flat position and can form a substantially 90° sharp edged corner as the cleaning element 723 wraps the tip end 702, and the corner ends 704, 706, of the cleaning head 701. This minimizes compression of the foam substrate 720 at the tip end 702, opposed corner ends and the side edges of the cleaning head 701 to insure that all portions of the cleaning element 723 are brought into contact with the surface to be cleaned without any peripheral edge gaps therebetween.

The enlarged pads 703, 705 and 707 may have a continuously solid outer most surface. Alternately, the enlarged areas 703, 705 and 707 can be formed of a plurality of equal length projections having a flat end surface which overall define a substantially flat surface on the bottom of the cleaning head 701.

Figure 10:
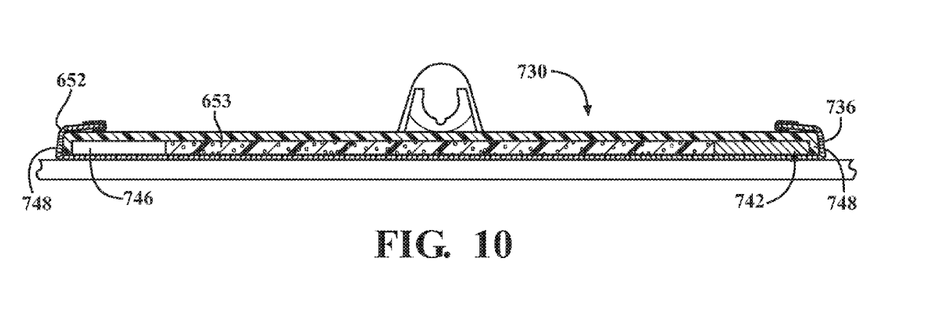
FIG. 10 is a cross-sectional view generally taken along line 10-10 in FIG. 9.

Another aspect of a cleaning apparatus 730 shown in FIGS. 9-10, which is modification of the apparatus 700 described above and shown in FIGS. 6-8 starts with the existing cleaning apparatus construction shown in FIG. 1. An enlarged surface area at the tip 736 and opposed ends or corners 738, 740 of the cleaning head 730 is achieved by fixedly attaching a hard element 742, 744, 746 to the peripheral lip 748 of the cleaning head 730 behind the tip end 736 and behind each opposed corner ends 738,740 of the cleaning head 730. The elements 742, 744, 746 are formed of a harder material then the foam substrate 653 and can be the same material used to form the cleaning head 730 as well as being formed of a hard rubber, open or closed cell foam having a higher density than the foam used to form the foam substrate 720. Pressure sensitive adhesive or other forms of attachment, such as snap in pins and apertures may be employed to securely and non-removably attach the elements 742, 744,746 to the bottom of the cleaning head 730.

In the side view of FIG. 9, since there is no foam 653 underlying the bottom surface of the elements 742, 744, 746 when the elements are mounted on the cleaning head 730, the elements 742, 744, 746 insure that the cleaning element makes a sharp 90° corner as it wraps around the tip 736 and the corner ends 738,740 of the cleaning head 730. This insures that all portions of the cleaning element are urged into contact with the surface being cleaned for maximum cleaning efficiency.

The elements 742, 744, 746 themselves may have a substantially angular shape consistent with the shape of the tip end 736 and the opposed corner ends 738,740 of the cleaning head 730.

The elements 742, 744, 746 may have a continuously solid outermost exposed surface or they can be formed of a thin back plate with a plurality of equal length projections terminating in flat end surfaces projecting a total height equal to the height of the peripheral lip 748.

Figure 11:
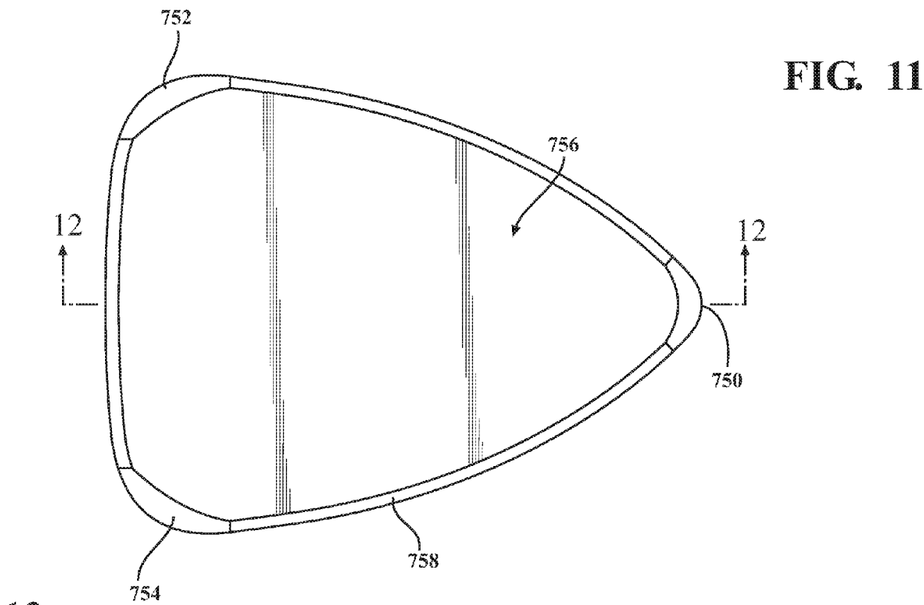
FIG. 11 is a bottom view of another aspect of a cleaning head.
Figure 12:
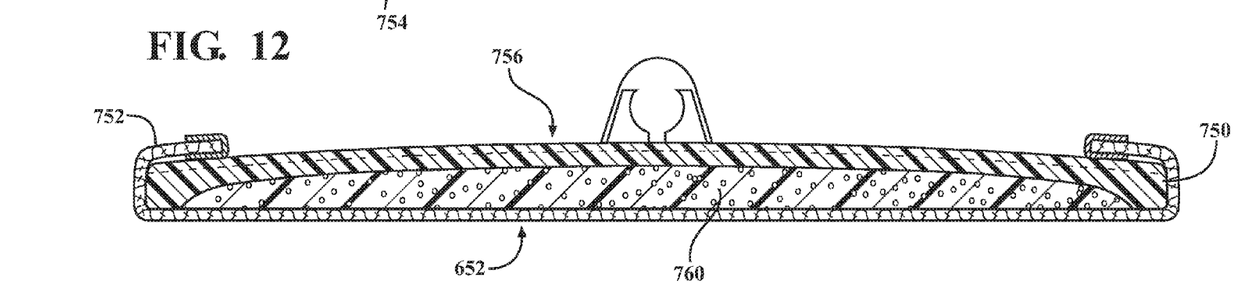
FIG. 12 is a cross-sectional view generally taken along line 12-12 in FIG. 11.

A similar cleaning apparatus is shown in FIGS. 11 and 12. In this aspect, the bottom surface of the tip end 750 and each of the opposed corner ends 752, 754 of the cleaning head 756 have an increased thickness. In this aspect, the increased thickness of the tip end 750 and the corner ends 752,754 is achieved by increasing the thickness of the peripheral wall 758 or lip at the tip end 750 and the opposed corner ends 752,754 of the cleaning head 756 during the molding of the cleaning head 756 itself. This forms a step at the tip end 750 and at each of the opposed corner ends 752,754 which is in direct contact with the edges of the cleaning element 652 to insure that the cleaning element 652 makes a sharp 90° bend around the tip end 750 and corner ends 752,754 without compressing the foam substrate 760 mounted to the bottom surface of the cleaning head 756 within the peripheral lip 758.

Figure 13:
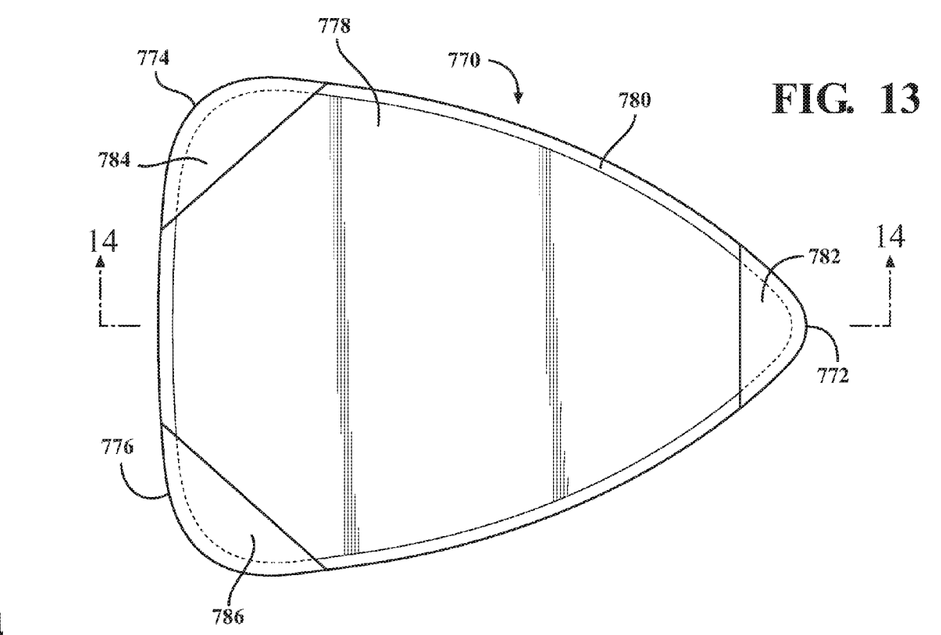
FIG. 13 is a bottom-elevational view of another aspect of a cleaning head.
Figure 14:
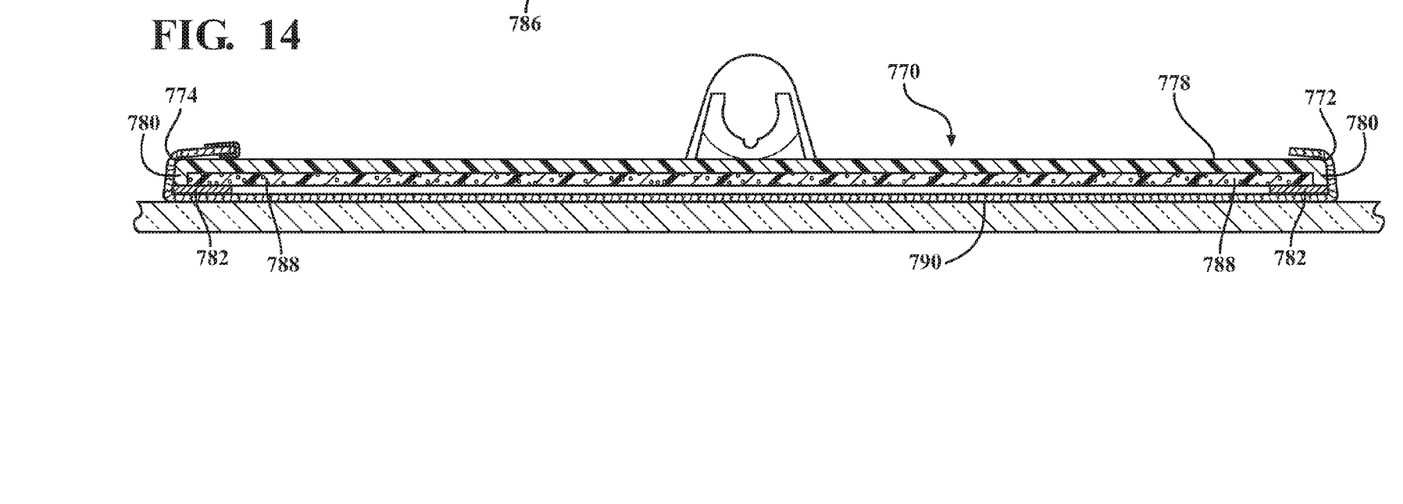
FIG. 14 is a cross-sectional view generally taken along line 14-14 in FIG. 13.

Another aspect of a cleaning apparatus 770 is shown in FIGS. 13-14. The cleaning apparatus 770 is similar to the cleaning apparatus 700 and 730 with the formation of a longitudinally concave cleaning head 778 having a tip end 772 and opposed ends 774 and 776. A peripheral lip 780 depends from the peripheral edge of the cleaning head 778 around the entire periphery of the cleaning head 778.

In this cleaning apparatus 770, individual caps 782,784, 786, having a thickness of approximately $\frac{1}{16}^{th}$ inch or equal to the length of the lip 780 and having an overall shape complimentary to the shape of the tip end 772 and the opposed ends 774,776 of the cleaning head 778 are mounted in a fixed manner to the bottom surface of the peripheral lip 780 adjacent to the tip end 772 and the opposed ends 774 and 776, respectively. The foam substrate 788 is cut out to fit in between the inner most surfaces of the caps 782,784,786 as well as the intervening portions of the peripheral lip 780. The caps 782,784,786 serve the same function as the enlarged pads and the large elements by forming enlarged, flat, hard surface areas adjacent the tip end 772 and the ends 774 and 776 to maintain the cleaning element wrapped there around at a sharp 90° corner at the outermost edge surfaces of the caps 782,784,786.

The caps 782,784,786 are formed of a hard material, such as the same plastic used to form the cleaning head 778 as well as a hard rubber, high density, hard foam, etc.

What is claimed is:

1. A cleaning apparatus comprising:
    a cleaning head having a top surface, a bottom surface and a peripheral edge;
    a handle pivotally coupled to the cleaning head;
    a cleaning element removably affixed to the cleaning head, the cleaning element including a body and elastic for removably securing the body over the bottom surface and the peripheral edge of the cleaning head;
    a peripheral lip depending from the peripheral edge of the cleaning head and surrounding the bottom surface of the cleaning head; and
    the cleaning head having a triangular shape with a tip end and two opposed ends;
    an enlarged area disposed at the tip end and at each of the two opposed ends of the cleaning head extending over the bottom surface of the cleaning head to an outer most edge of the peripheral lip; and
    a compressive foam layer carried on the bottom surface of the cleaning head in between the peripheral lip and each enlarged area.

2. The cleaning apparatus of claim 1 wherein:
    the enlarged areas are pads having a length from an adjacent one of the tip end and the opposed ends of between 0.5 and 1.0 inches.

3. The cleaning apparatus of claim 1 further comprising:
    the enlarged areas are pads defining flat surfaces.

4. The cleaning apparatus of claim 1 wherein:
    the enlarged areas are pads defining a hard surface.

5. The cleaning apparatus of claim 1 wherein:
    the enlarged areas are pads integrally molded with the cleaning head.

6. The cleaning apparatus of claim 1 wherein:
    the enlarged areas are pads defining a separate element fixedly mounted adjacent the tip end and two opposed ends on the bottom surface of a cleaning head.

7. The cleaning apparatus of claim 1 comprising:
    the enlarged areas are the portions of the peripheral lip adjacent to the tip end and each of the opposed ends of the cleaning head having an increased thickness relative to the remainder of the peripheral lip; and
    the compressive foam layer having a thickness at least the same as a thickness of the enlarged areas at the tip end and the opposed ends of the cleaning head.

8. A cleaning apparatus comprising:
    a cleaning head having a top surface, a bottom surface and a peripheral edge;
    a handle pivotally coupled to the cleaning head;
    a cleaning element removably affixed to the cleaning head, the cleaning element including a body and elastic for removably securing the body over the bottom surface and the peripheral edge of the cleaning head;
    a peripheral lip depending from the peripheral edge of the cleaning head and surrounding the bottom surface of the cleaning head;
    a compressive material layer mounted on the bottom surface of the cleaning head within the peripheral lip;
    the cleaning head having a tip end and opposed ends, with side edges extending between the tip end and the opposed ends;
    the tip end and the opposed ends of the cleaning head disposed at a depending angle relative to the bottom surface of the cleaning head to generate downward force on the tip end and the opposed ends of the cleaning head when the cleaning head is engaged with a surface to be cleaned.

9. The cleaning apparatus of claim 8 wherein:
    the tip end and the opposed ends of the cleaning head are disposed at a linear obtuse angle relative to the bottom surface of the cleaning head.

10. The cleaning apparatus of claim 8 wherein:
    the depending portions of the cleaning head at the tip end and the opposed ends are disposed at an arcuate bend relative to the bottom surface of the cleaning head.

11. The cleaning apparatus of claim 8 further comprising:
    the plurality of side edges of the cleaning head are disposed at a downward depending angle relative to the bottom surface of the cleaning head.

* * * * *